(12) United States Patent
Leicher et al.

(10) Patent No.: US 9,490,984 B2
(45) Date of Patent: Nov. 8, 2016

(54) METHOD AND APPARATUS FOR TRUSTED AUTHENTICATION AND LOGON

(75) Inventors: Andreas Leicher, Frankfurt am Main (DE); Andreas U. Schmidt, Frankfurt am Main (DE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 449 days.

(21) Appl. No.: 12/558,907

(22) Filed: Sep. 14, 2009

(65) Prior Publication Data

US 2011/0067095 A1 Mar. 17, 2011

(51) Int. Cl.
| | |
|---|---|
| H04L 29/06 | (2006.01) |
| H04L 9/32 | (2006.01) |
| G06F 21/57 | (2013.01) |
| G06F 21/00 | (2013.01) |

(52) U.S. Cl.
CPC ........... *H04L 9/3234* (2013.01); *H04L 9/3271* (2013.01); *H04L 63/06* (2013.01); *H04L 63/0807* (2013.01); *H04L 63/12* (2013.01); *G06F 21/00* (2013.01); *G06F 21/57* (2013.01); *G06F 2221/2103* (2013.01); *G06F 2221/2129* (2013.01); *H04L 63/0823* (2013.01); *H04L 2209/127* (2013.01); *H04L 2209/80* (2013.01)

(58) Field of Classification Search
CPC ............... G06F 21/57; G06F 21/00; G06F 2221/2103; G06F 2221/2129; H04L 63/0823; H04L 2209/127; H04L 9/3271
USPC ....... 713/150, 152, 156, 162, 168, 171, 172, 713/175, 185; 726/10, 21, 27; 380/44, 247, 380/259, 270, 285
See application file for complete search history.

(56) References Cited

U.S. PATENT DOCUMENTS

| | | | |
|---|---|---|---|
| 5,590,199 | A | 12/1996 | Krajewski et al. |
| 8,332,919 | B2 | 12/2012 | Gomi et al. |

(Continued)

FOREIGN PATENT DOCUMENTS

| | | |
|---|---|---|
| EP | 1988485 A1 | 11/2008 |
| JP | 11-507752 | 7/1999 |

(Continued)

OTHER PUBLICATIONS

Stefan Berger, Ramon Caceres, Kenneth A. Goldman, Ronald Perez, Reiner Sailer and Leendert van Doorn, vTPM: Virtualizing the Trusted Platform Module, Jul. 2006, IBM T. J. Watson Research Center, retrieved from http://www.kiskeya.net/ramon/work/pubs/security06.pdf on Dec. 12, 2011.*

(Continued)

*Primary Examiner* — Carl Colin
*Assistant Examiner* — Gary Lavelle
(74) *Attorney, Agent, or Firm* — Baker & Hostetler LLP (57) ABSTRACT

A method and apparatus for trusted authentication and logon is disclosed. A trusted platform module (TPM) based logon method is presented for authentication and access. A user registers an identity with an identity provider that is tightly bound to the user's specific platform, e.g., the TPM. If the user decides to login, for example to a service provider using this identity, the identity provider challenges the user to provide the correct credentials. The credentials consist of a TPM generated ticket, that is, a credential chain. This allows the user to login without the need for a password at the identity provider.

21 Claims, 6 Drawing Sheets

(56) References Cited

U.S. PATENT DOCUMENTS

| | | | |
|---|---|---|---|
| 2004/0193888 A1* | 9/2004 | Wiseman et al. | 713/176 |
| 2005/0137889 A1* | 6/2005 | Wheeler | 705/1 |
| 2005/0177749 A1* | 8/2005 | Ovadia | 713/201 |
| 2005/0216736 A1* | 9/2005 | Smith | 713/168 |
| 2006/0095526 A1 | 5/2006 | Levergood et al. | |
| 2006/0123469 A1* | 6/2006 | Lee et al. | 726/4 |
| 2006/0242428 A1* | 10/2006 | Tarkkala | 713/189 |
| 2007/0016801 A1* | 1/2007 | Bade et al. | 713/193 |
| 2007/0260603 A1* | 11/2007 | Tuscano et al. | 707/9 |
| 2007/0266256 A1* | 11/2007 | Shah et al. | 713/178 |
| 2008/0010455 A1 | 1/2008 | Holtzman et al. | |
| 2009/0271637 A1* | 10/2009 | Takekawa et al. | 713/189 |
| 2009/0282263 A1* | 11/2009 | Khan et al. | 713/189 |
| 2010/0011214 A1* | 1/2010 | Cha et al. | 713/175 |
| 2010/0061368 A1* | 3/2010 | Garofalo | 370/390 |
| 2010/0077454 A1* | 3/2010 | Xiao et al. | 726/3 |
| 2011/0213959 A1* | 9/2011 | Bodi et al. | 713/155 |
| 2012/0246470 A1* | 9/2012 | Nicolson et al. | 713/158 |
| 2014/0245007 A1* | 8/2014 | Buer et al. | 713/168 |

FOREIGN PATENT DOCUMENTS

| | | |
|---|---|---|
| JP | 2002-139996 | 5/2002 |
| JP | 2007-219935 A | 8/2007 |
| JP | 2008-33512 A | 2/2008 |
| JP | 2013-504832 | 2/2013 |
| WO | WO 96/42041 A2 | 12/1996 |
| WO | WO 2009/105542 | 8/2009 |
| WO | WO 2011-031272 | 3/2011 |

OTHER PUBLICATIONS

Nicolai Kuntze and Andreas U. Schmidt, Trusted Ticket Systems and Applications, Jan. 23, 2007, Fraunhofer-Institute for Secure Information Technology SIT, retrieved from http://arxiv.org/abs/cs/0701144.*

PCT Application No. PCT/US2009/056823 : International Search Report and Written Opinion of the International Searching Authority, Jul. 23, 2010, 13 pages.

PCT Application No. PCT/US2009/056823 : Written Opinion of the International Preliminary Examining Authority , Oct. 12, 2011, 4 pages.

International Patent Application No. PCT/US2009/105542, Notification Concerning Availability of the Publication of the International Patent Application dated Aug. 27, 2009, 63 pages.

Feng et al, "Research on Attestation Method for Trust Computing Environment", China Journal of Computers, 31(9), Sep. 15, 2008, 1640-1652, with Abstract.

Gong et al, "The Research Survey of Trusted Computing and Its Application of Security", Journal of Jiangxi Normal University, Jun. 15, 2009, 33(3), 348-352, with English Abstract.

Liu et al, "Application of Trusted Computing in a VPN", Journal of Computer Applications, Dec. 31, 2006, 26(12), 2935-2937, with English Abstract.

Ma et al, "Security System Structure in Wireless LAN", Higher Education Press, May 31, 2008, 332-368, No abstract—in Chinese language.

Zhou et al, "Application of Attestation Identity Credential in Trusted Computing", Journal of Computer Engineering, 35(3), Feb. 5, 2009, 21 to 22, and 70., with English Abstract.

Japanese Application No. 2015-011333: Notice of Rejection dated Apr. 5, 2016, 13 pages.

Klenk et al, "Preventing Identity Theft with Electronic Identity Cards and the Trusted Platform Module", Proceedings of the Second European Workshop on System Security, Mar. 31, 2009, 44-51 pages.

Maruyama et al, "Software Integrity Verification Technique", Information Processing, 45(4), Apr. 15, 2004, 354-359.

Matsuoka, K., Open ID Which Can Be Used Righ Now, First Installment, Use OpenID Service and Understand Mechanism of OpenID, Apr. 8, 2008, 5 pages, http://gihyo.jp/dev/featire/01/openID/0001.

Nakamura, T. and Higashikawa, A., "Summary and Latest Trend of PC-Mounted Security Chip (TPM),", Information Processing, 47(5), 473-478, May 15, 2006.

* cited by examiner

METHOD AND APPARATUS FOR TRUSTED AUTHENTICATION AND LOGON

FIELD OF INVENTION

This application is related to authentication and access.

BACKGROUND

Identity management and user authentication and access are critical issues for Web usage, mobile services, wireless communications and other services. There are a number of authentication and access protocols. For example, OpenID is an open, decentralized framework and method for user authentication and access control. A single digital identity allows users to log on once and gain access to multiple services. The digital identity is generally in the form of a unique universal resource locator (URL) that is typically hosted by an identity provider. The identity provider authenticates the user when the user desires to access a service provider with the digital identity. The OpenID framework allows for different authentication methods to authenticate a user. To claim an identity at the identity provider, several methods can be used; most common is the use of logon forms, where the user provides a password. However, without the use of trusted systems, the relying party will not gain enough evidence to establish a trust relationship to the communication partner submitting the authentication credentials. The user credentials (e.g. in the form of username/password combination) are not bound to the platform and thus could have been stolen. The attacker could use the stolen credentials to access services in the name of the legitimate user. By binding the authentication credentials for the OpenID protocol to the platform and its trustworthy state, the security and safety of the OpenID protocol can be enhanced.

In a ticket based authentication and authorization protocol, software tokens (i.e., tickets) are used to prove the identity of a single entity/user. Based on these tokens, access to certain systems is restricted to entities/users producing appropriate tokens. Additionally, data embodied in the token may be used to implement an authorization control enabling a token based access control scheme besides mere authentication.

Another authentication and authorization protocol uses attestation identity keys (AIKs), generated by a trusted platform module (TPM) in a trusted computing environment, as identifying credentials in ticket systems. AIKs are used to sign trust measurements and certify keys generated by a TPM. Current implementations of such a trusted ticket based system require the use of a central database to maintain a shared key database or Public Key Infrastructure (PKI) for the encryption of the tickets and all service providers need to be modified to evaluate and accept the received tickets.

SUMMARY

A method and apparatus for trusted authentication and logon is disclosed. A trusted platform module (TPM) based logon method is presented for authentication and access. A user registers an identity with an identity provider that is tightly bound to the user's specific platform, e.g., the TPM. If the user decides to login, for example to a service provider using this identity, the identity provider challenges the user to provide the correct credentials. In this method the credentials consist of a TPM generated ticket, incorporating a cryptographic credential chain. This allows the user to login without the need for a password at the identity provider. A local password at the user's specific platform may still be used to protect the identity from local attack.

The logon is combined with an integrity verification of the specific platform. Using a TPM signed statement on the platform configuration registers (PCRs) of the TPM, which securely store the system configuration, the identity provider may compare the reported system state to previously generated reference values, and allowing only the legitimate user using a trustworthy platform to login and claim an identity. This combined authentication and attestation allows for a fine grained access control by not only binding the authentication data to the specific platform but also to a predefined system state which is considered trustworthy. This enables new use cases for authentication and access methods which require an enhanced security and safety of the system and will not allow any modifications leading to a non-trustworthy system.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, evolved Node-B, a site controller, an access point (AP), or any other type of interfacing device capable of operating in a wireless environment.

The disclosure herein uses the OpenID protocol as an example authentication and access system and is applicable to other authentication and access systems. The basic entities and their high level flow are first described, followed by a detailed discussion of the method.

Figure 1:
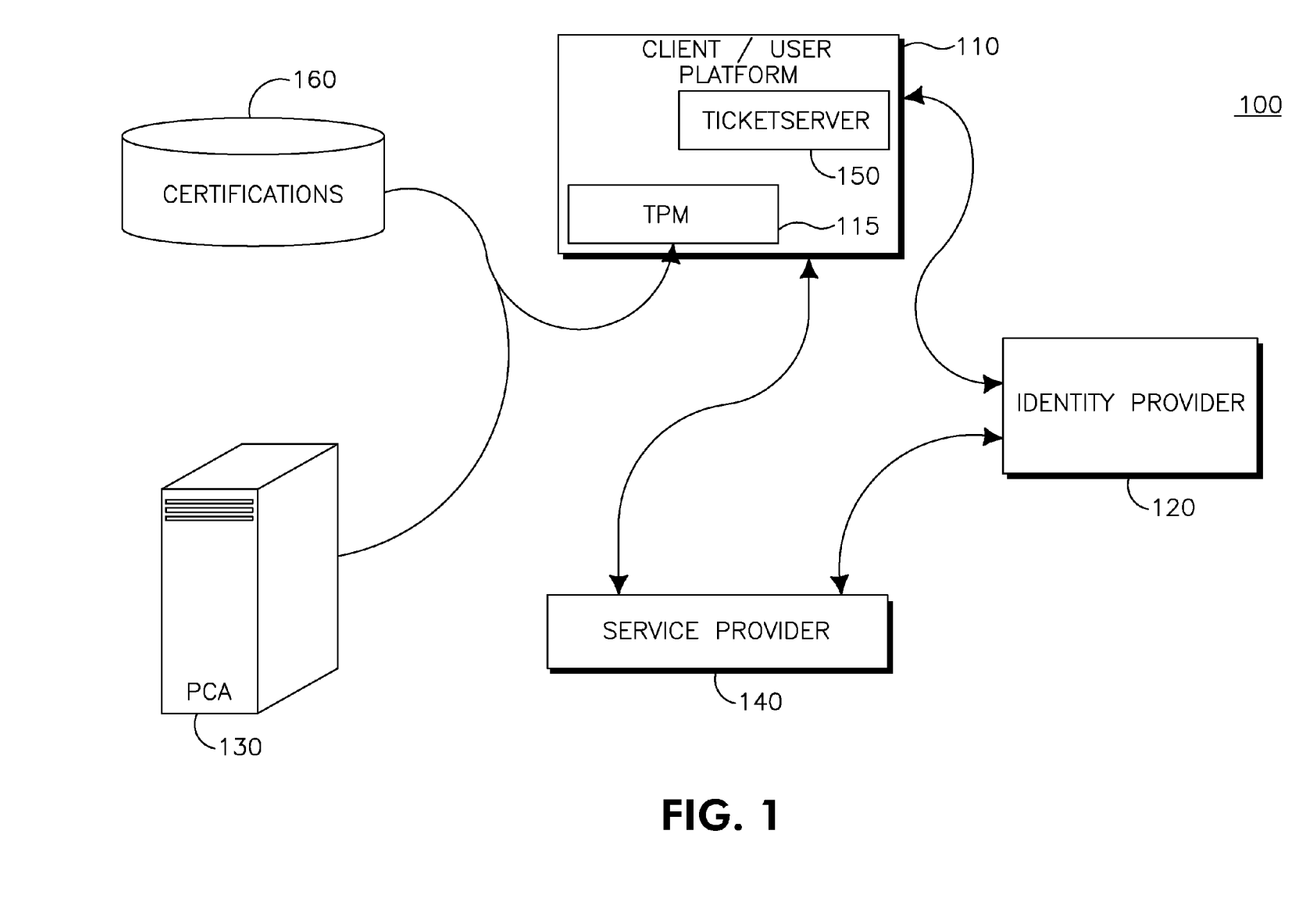
FIG. 1 shows an example high level architecture for an authentication and access system.

FIG. 1 is an example authentication and access system 100 including, but not limited to, a client/user platform 110, an identity provider 120, a privacy certification authority (PCA) 130 and a service provider 140. The client/user platform 110, the identity provider 120 and the service provider 140 are in communication with each other through any combination of wireless and wired communication systems. Client/user platform 110 is in further communication with the PCA 130, which is in communication with a storage media 160 that stores, for example, certifications.

Client/user platform 110 may be a WTRU, base station, computing platform, or any device that may need authentication. The client/user platform 110 includes, but is not limited to, a trusted platform module (TPM) 115 that provides remote attestation and sealing and binding capabilities for data for the client/user platform 110. The TPM 115 is a microcontroller that stores keys, passwords, digital certificates and is able to generate cryptographic keys. It may be affixed to the motherboard, or integrated into the system's chipset, and may be used in any computing device that requires these functions. TPM 115 ensures that the information stored there is made more secure from external software attack and physical tampering, and eavesdropping. Access to data and secrets in the TPM 115 or client/user platform 110 may be denied if the measurement values taken for components during a boot sequence are not as expected versus reference measurements. Critical applications and capabilities such as secure email, secure web access and local protection of data are thereby made much more secure. Although a trusted platform module is discussed herein, other alternative trust centers may be used, such as for example, a mobile trusted module.

The TPM 115 uses an endorsement key (EK) that is a 2048-bit RSA public and private key pair, which is created randomly on the chip at manufacture time and cannot be changed. The private key never leaves the chip, while the public key is used for attestation and for encryption of sensitive data sent to the chip. The public parts of the EK are generally known by the PCA 130 via the EK certificate for purposes of attestation. In general, whenever the TPM 115 needs to authenticate itself to a verifier, such as for example an identity provider, it generates a second RSA key pair, called an Attestation Identity Key (AIK), sends the AIK public key to the PCA 130, and authenticates this public key against the corresponding EK. If the PCA 130 finds this EK in its list, it issues a certificate on the TPM's 115 AIK. The TPM 115 may then provide this certificate to the identity provider 120 and authenticate itself.

As stated herein, AIKs (at least the identity embodied in the AIK) represent at least one part of the ticket described herein. The usage of the AIKs as tickets is however restricted by the TPM 115. Therefore an indirect approach, termed the CertifyKey operation, is used wherein a signing key is generated by the TPM 115 and certified by signing it with an AIK. This key is called a certified signing key (CSK). The CSK and AIK, together with the PCA attesting to the validity of the AIK, constitute a portion of the ticket described herein.

The client/user platform 110 also includes a TicketServer 150 that generates the credentials, or tickets, for service access. TicketServer 150 authenticates the user. TicketServer 150 validates the client/user platform 110, and itself, toward the identity provider 120 using trusted computing methods of platform attestation. The TicketServer 150 is not present in current non-trusted OpenID architecture, where the corresponding role is played simply by local credential storage. Since more security-critical information and operations are concentrated in the TicketServer 150, it must be trusted to handle AIK certificates and CSKs properly and not proliferate them to other platforms; protect tickets and credentials; protect any security-critical operation on all credentials by user authorization; provide secure options to be directly integrated into common web-browsers and be accessed by them; and collect, process and send platform validation data. This is disclosed in more detail herein.

The user has to choose a PCA 130 to certify the AIKs created in the TPM 115. The PCA 130 may hold all identity related information and contractual measures have to be taken to ensure non-disclosure of this identity related information. After certifying an AIK at the PCA 130, the user may choose an identity provider 120 to host the claimed identity. The claimed identity is represented by a universal resource identifier (URI) chosen by the user. In order to register such a claimed identity, the user must provide a valid AIK certificate to the identity provider 120. This is disclosed in more detail herein.

The identity provider 120 may only be presented with a minimal amount of identity related information. The user may decide which information hosted at the PCA 130 may and will be revealed to the identity provider 120. Contractual measures have to be taken to ensure coordination between the parties otherwise a rogue PCA could certify identities belonging to a different user. As the PCA 130 will not reveal the user's real identity to the identity provider 120, the identity provider 120 will not be able to link different requests to a single identity.

The PCA 130 is the only instance that will be able to resolve a claimed identity to a real identity. This may easily be done by keeping a secured database that maps (unique) EK certificates to AIKs. The EK certificates used during AIK certifications allow for an undoubted identification of the TPM 115 and hence the client/user platform 110 (assuming that only one user has physical access to the platform 110 this resolves to the user).

The service provider 140 only has to enable identity provider login for the site. For example, the service provider 140 may have an OpenID login logo on the front page. The identity provider 120 used by the user/client has to be in the list of known and accepted identity providers of the service provider 140.

Figure 2:
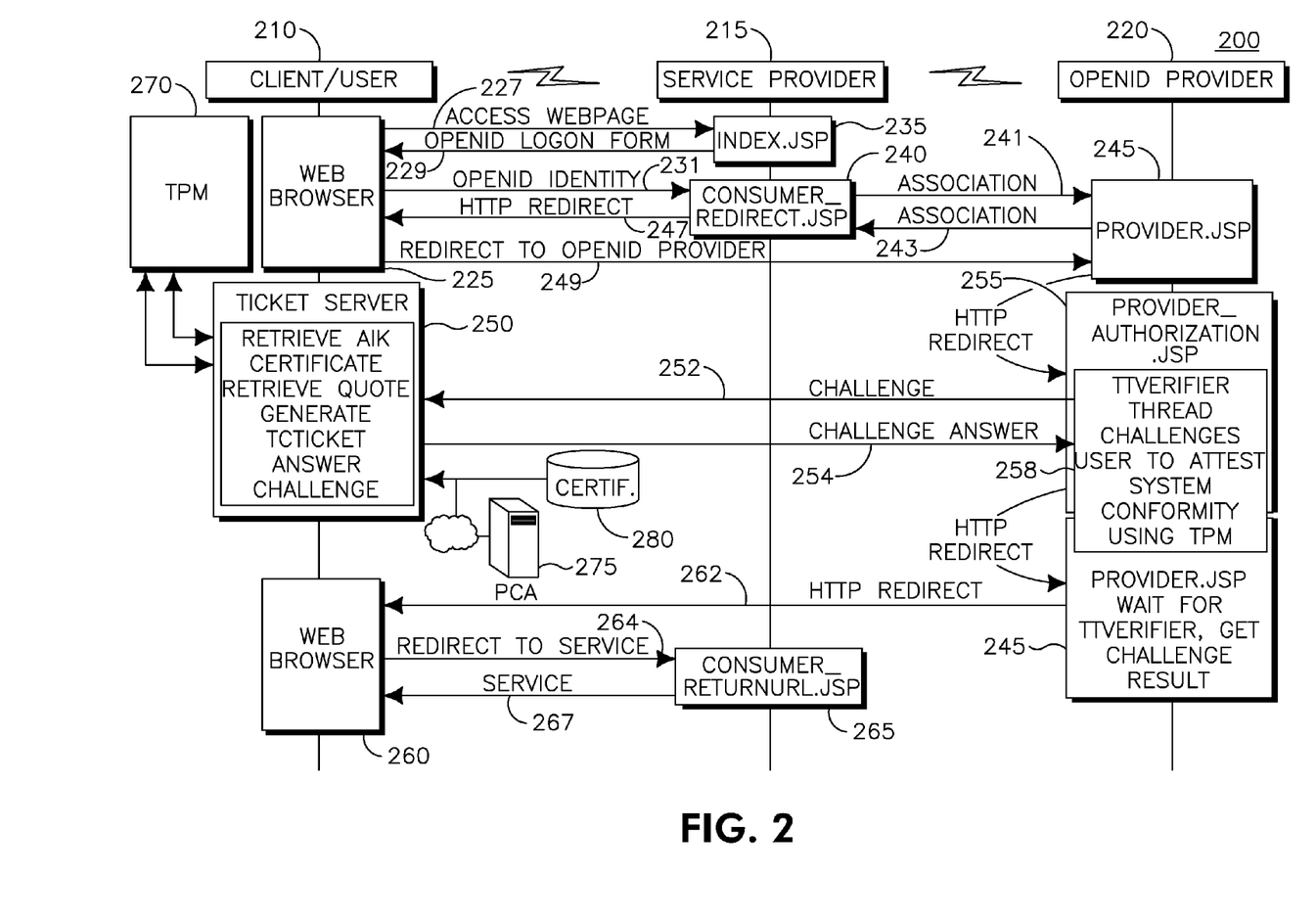
FIG. 2 shows an example high level signal flow diagram for an authentication and access method.

Referring now to FIG. 2, there is shown an example high level signal flow 200 for the system 100 disclosed in FIG. 1. As discussed herein, a client/user or user platform 210, service provider 215 and identity provider 220 (shown as an example OpenID Provider) are configured for communications between each other.

The client/user platform 210 uses its Web browser 225 to access a service provider webpage (identified as index.jsp 235) via an access webpage message 227. If the client/user 210 wants to login using his, for example, OpenID URI, the index.jsp page 235 at the service provider 215 requests the URI via OpenID logon form message 229 and thus retrieves the address of the OpenID provider 220 hosting the claimed identity via OpenID identity message 231.

The service provider 215 then attempts to form an association with the OpenID provider 220. In accordance with the OpenID protocol, the service provider 215 associates with the OpenID provider 220 via association message 241. This includes a secure exchange of the request, the claimed identity and a return URL via association message 243 to which the client/user platform 210 will be sent a redirect message 247 by the OpenID provider 220 if authentication is successful. This is performed by consumer_redirect.jsp 240 at server provider 215 and by provider.jsp 245 at OpenID provider 220. After association, the client/user platform 210 is redirected to provider.jsp webpage 245 of the OpenID provider 220 via redirect to OpenID provider message 249.

The OpenID provider 220 then switches from the provider.jsp webpage 245 to the provider_authorization.jsp webpage 255 to authenticate the client/user platform 210. The user initiates the request by clicking a link on provider_authorization.jsp webpage 255. This starts a new background thread TTverifier 258 which challenges the TicketServer 250 via challenge message 252. The provider_authorization.jsp webpage 255 redirects the client/user platform 210 back to the provider.jsp webpage 245 which waits for the TTverifier 258 to finish and evaluate the result of the challenge provided in challenge answer message 254. As described herein, TicketServer 250 uses TPM functionality to generate the appropriate answer including a ticket and in general interacts with TPM 250, PCA 275 and storage media 280 which hold, for example, certifications.

Assuming a successful authentication, the provider.jsp webpage 245 sends a redirection message 262 to the client/user platform 210. Redirection message 262 redirects the client/user platform 210 to the consumer_returnurl.jsp page 265 at the service provider 215 via redirect to service message 264. The consumer_returnurl.jsp page 265 checks that the redirect comes from the associated OpenID provider 220 and grants access to the client/user platform 210 via service message 267.

Figure 3A:
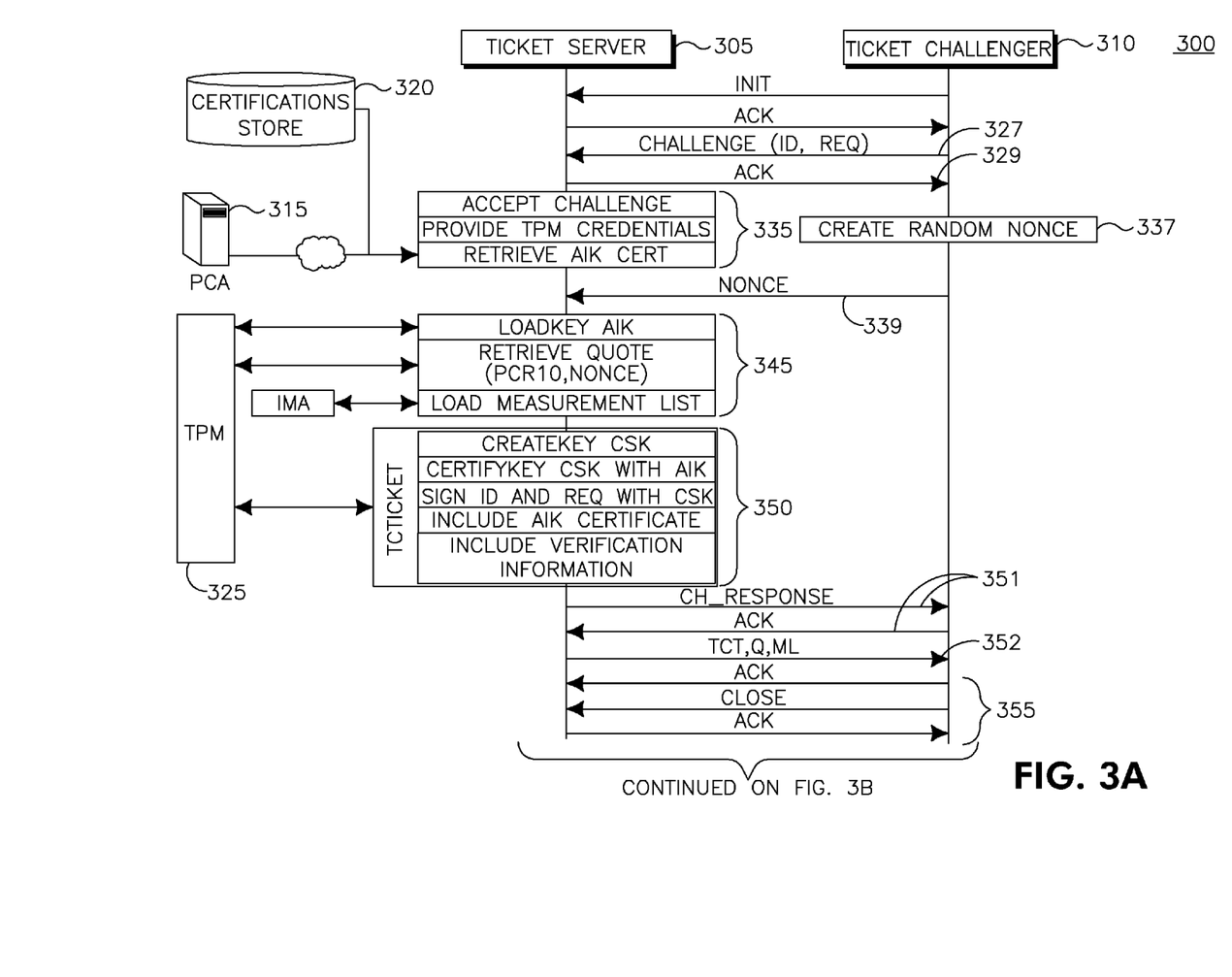
FIGS. 3(a) and 3(b) show an example signal flow diagram for an authentication and access method.
Figure 3B:
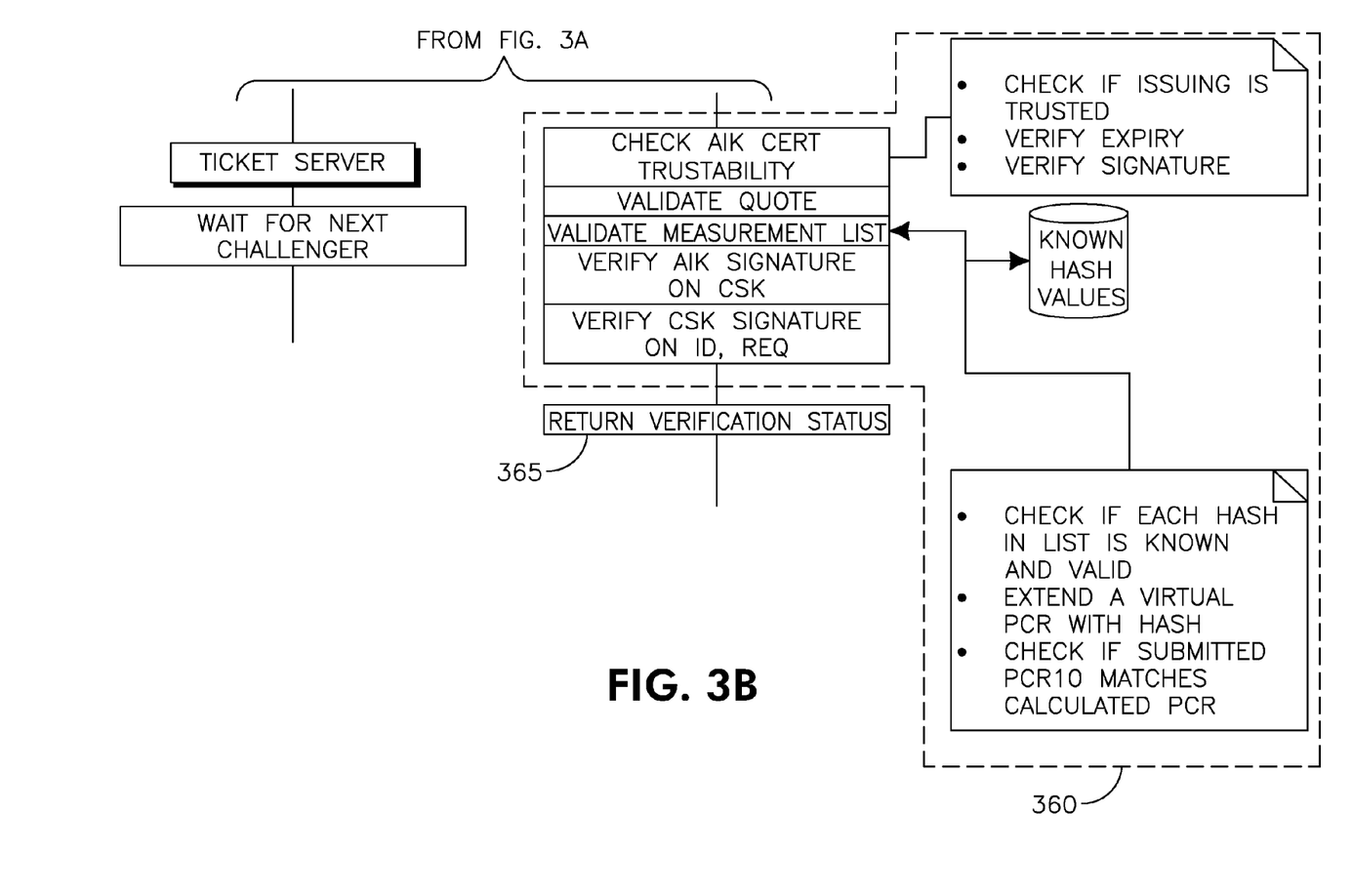

Referring now to FIGS. 3(*a*) and 3(*b*), there is shown a signal flow chart 300 between a TicketServer 305 and a Ticket Challenger 310. Also shown is the signal flow between the TicketServer 305 and PCA 315, certification storage media 320 and TPM 325.

The TicketServer 305 runs as a service application on the client. It listens on a predefined port and waits for challenges. Upon receipt of a challenge message 327 (containing the identity the user wanted to use in, for example, OpenID and the service request that was issued at the service provider), the user is required to explicitly allow the challenge using an acknowledge message 329. The user has the option to deny the challenge. If denied, then the OpenID authentication will fail.

If the challenge is accepted, the user is prompted to enter the password for the AIK corresponding to the given identity and to authenticate TPM 325 usage by entering the storage root key (SRK) password at TicketServer 305. The SRK is then included in the TPM command which is able to access TPM secured keys. The TicketServer 305 then tries to retrieve a previously acquired AIK certificate for this identity from the certificate storage media 320, collectively shown as 335, which is needed for system state information retrieval 345 and TCTicket generation 350 as discussed herein. The certificate could either come from a previous AIK certification with a PCA, such as PCA 315, and thus can be retrieved from local certificate storage on the system, such as certification storage media 320, or if the certificate is not available in the local storage (or the certificate for the AIK in the local storage has expired or became invalid for any reason), a new certificate for the identity represented by the AIK can be requested from the PCA 315. Specifically, if no certificate can be found in the certificate storage media 320, the user may choose PCA 315 to connect to in order to undergo an AIK certification process and obtain a certificate for the AIK. Therefore, the user must supply the correct owner password of the TPM 325. This prevents creation of rogue identities by persons other than the owner of the TPM 325. As shown below, the user input is forwarded by TicketServer 305 to TPM 325 where the password is evaluated.

In response to accepting the challenge, the Ticket Challenger 310 creates a random nonce 337. The TicketServer 305 receives the random nonce 337 from the Ticket Challenger 310 via nonce message 339. An AIK-signed quote Q of the PCR values describing the system configuration, including the nonce is retrieved from the TPM 325, making a statement about the system's state, collectively shown as 345.

The TicketServer 305 then creates a TCTicket, collectively shown as 350. The TCTicket creation 350 involves creation of a new key by the TPM (a RSA key pair) that may be used to sign the request and the identity. As described herein, this new key is certified with the AIK using the CertifyKey operation. That is, the TPM uses the function CertifyKey for this newly created key pair to generate a certification statement and a binding, where a binding refers to building a chain of trust to the AIK and to the AIK certificate from the PCA. When the newly created key is certified successfully, it is referred to as a certified signing key (CSK). There may be multiple CSKs, and multiple AIKs in a TPM (or secured by the TPM in the secure storage protected by the TPM).

The needed information to verify the TCTicket 350 is included in the TCTicket 350, so that a receiving party (in FIGS. 3(*a*) and 3(*b*) represented by the Ticket Challenger 310) may easily verify the TCTicket 350. Together with the plain-text measurement log ML and the quote Q, the response including the TCTicket 350 is sent back to the Ticket Challenger 310 via TCT, Q, ML message 352. CH_RESPONSE and ACK messages (collectively 351) are protocol signaling messages to inform the receiving party, i.e., Ticket Challenger 310, that the next message will contain the TCTicket 350, the quote and the ML. It should be noted that at this juncture in the process, FIGS. 3(*a*) and (*b*) represent the inner operations of the TTVerifier Thread 258 in FIG. 2. Since the OpenID provider may handle multiple requests at the same time, it must be sure that every requesting client gets a new, fresh and unique challenge to prevent replay attacks.

Upon acknowledgement of the TCTicket 350 via messages 355, the Ticket Challenger 310 now has the following data: the AIK signed quote from the TPM 325, including the nonce 337 as anti-replay protection; the plain-text measurement file; the TCTicket 350 including the signed identity string, signed request string, public key portion of the CSK, AIK signature on the public key portion of the CSK, and AIK certificate issued by the PCA 315. In order to authenticate the client, the Ticket Challenger 310 checks the following information, collectively shown as 360: validates (timestamp) of AIK certificate; verifies PCA signature on AIK certificate; verifies AIK signature on CSK public key hash in TCTicket 350; verifies signature on service request and identity in TCTicket 350; validates the entries in the measurement list; and verifies that the actual (quoted) platform configuration registers (PCR) values correspond to the measurement list ML.

If any item in this verification process fails, the client will not be authenticated. A specific credential chain is built by TicketServer 305 and PCA 315, namely, AIK certificate-certified CSK-signed request. A verification status message 365 is sent to the user. This is also shown, for example, by redirection message 262 in FIG. 2. In this instance, message 262 may redirect an user's browser to either the service providers return_url or the user is authenticated at the service provider. If any of the above verifications fail (certificate failures or system integrity failures), the redirect will send the user to a 'authentication failed' page at the OpenID provider. As an alternative, it may be possible to create customized result pages at the OpenID provider in the case of a failed authentication, showing the cause of the failure. This could include showing the user which modules or software failed the integrity checks and could be leveraged to a system which proposes the user next steps to bring his system back into a trustworthy state.

In view of the disclosure herein, the role of the PCA, such as for example PCA 275, is different from the one it plays in current ticket systems employing trusted computing. For example, the PCA 275 may need to be invoked only once for every partial identity to be used with a specific service provider 215. In an initial registration, the client/user platform 210 associates its platform identity with the pseudonymous, partial identity. The PCA 275 provides a certificate for this pseudonymous identity and stores the association of the pseudonym to the platform identity. This data is privacy sensitive and thus has to be protected. In another example, the positioning of the PCA 275 allows for additional options as compared with current ticket systems. The trust model and method disclosed herein allows placement of the PCA 275 in places other than at the identity provider 220 and at the selection of the user.

In the disclosed method and architecture, the user may select an arbitrary external PCA whose AIK certificates are accepted by the identity provider, or use PCA functionality provided directly or indirectly by the identity provider. In this latter example, the PCA or PCA functionality may be placed in the identity provider to reduce complexity and provide seamless replacement of the registration with an identity provider via a Web form.

Due to its specific security architecture, the present disclosure mitigates specific threats for identity management systems employing trusted computing which rely on the encryption of identity related information. In Trusted OpenID, for example, the AIK certificate is known and visible to the client; thus the AIK certificate cannot contain hidden information that threatens privacy.

In another example, OpenID implementations present an OpenID provider login form to the user. The user enters his/her credentials and the OpenID provider issues a cookie to the client. This cookie is then used for every subsequent OpenID enabled service access. This may lead to several attacks on the OpenID protocol: (1) direct attacks on the user credentials used to login to the client's OpenID provider (phishing with a fake OpenID provider page will expose a large amount of user credentials, allowing for identity theft) and; (2) attacks involving the re-use, copying, and theft of the cookie from the client's computer after authentication, leading to identity theft.

Both attacks are mitigated by the disclosure presented herein. All user passwords are local and are provided to the local trusted TicketServer only, the problem of credential phishing is defeated. Furthermore the pseudonymous identities are bound to the platform, e.g., the TPM, thus they cannot be copied to another device.

Moreover, cookies are not stored on the client's platform. This prevents the threat of local re-use. Consider e.g., a computer shared by multiple persons. If person A logs into his OpenID account, and forgets to sign out, person B could use the stored cookie to impersonate A. An option may be to integrate the present disclosed authentication method seamlessly into the Web Browser. Whenever a user wants to access a service using trusted the disclosed method herein, the identity provider creates a new challenge for the TicketServer. The user only sees a prompt from the trusted TicketServer application, asking the client for the local AIK password, which is needed to answer the challenge. The TicketServer does not store this AIK authentication secret. If another user B at the same platform wants to access the service, the TicketServer is again challenged by the identity provider and B has to provide the local AIK password of A (which he doesn't know). The goal is to have a one-time cookie which is not stored permanently on the client's platform. Alternatively, the binding of the user authentication to the device may be facilitated through biometrics. In an integrated device, biometrics may be done transparently, dynamically and often so as to always ensure that the device is being used by a bona-fida user.

The disclosure herein may use encryption on an issued cookie in a manner such that the target platform (which is the user platform as seen from the perspective of the identity provider) and user may decrypt it and use it as an authentication token. The identity provider encrypts the cookie using a secret key and sends it to the TicketServer on the client side, protected by the public CSK. Although CSK is not meant for bulk encryption of arbitrary amounts of data, it may be used to encrypt the secret key which is used to encrypt the cookie. The secret key may be a symmetric or asymmetric key.

Using the TPM, the cookie may then be decrypted when needed. The decryption requires the user to authenticate for the CSK usage with the (local) CSK secret. The TicketServer ensures that the cookie is stored encrypted and is decrypted only if required.

In a further application, the disclosed authentication and access method may be used for a combined authentication and access and authorization method. A major search engine company recently announced support for OAuth, an example API authorization method, so as to provide a seamless user experience when accessing Web services. The user will access the Web service using the service provider provided access link and at the same time grant the Web application access to the service provider-hosted services via for example, OAuth. OpenID is used to authenticate the user with a centrally stored identity. OAuth is used to authorize the Web service to access user's data such as calendar, docs, etc. The combination of both protocols in a single step improves the single-sign on experience of the user and allows for new Web services, which need access to different user data, e.g. mash-ups, dashboards, etc.

Instead of having the user's TPM only sign the identity provider, for example as an OpenID challenge, the TPM will sign the combined, for example, OpenID/OAuth challenge as presented by the identity provider through the Web application's request. User identification and authorization as well as the acceptance of access to the data are signed securely by the TPM. As disclosed herein, the security for the user is improved by (1) binding the login and authorization to the hardware TPM, and (2) providing platform integrity verification by the OpenID/OAuth provider, to prevent stealing of sensitive data by malicious software running on the client. The integrity verification also increases the level of security for the Web application. Only clients in a proven integrity verified state may be given access to the Web service. This permits the establishment of new Web services for security and privacy critical applications. The fact that the authorization provider, e.g., OAuth, token access is signed by a TPM that can be uniquely identified, the described method provides non-repudiation. This facilitates charging processes which may be implemented by the service provider of the Web application. The signature allows the Web application provider to prove that the user requested and accessed the Web service.

The TPM based user authentication allows linkage between the platform identity and the identity provider. The identity provider is required to keep a database of registered identities for a given platform. Whenever a login attempt from another platform using one of the registered identities is detected, the identity provider: (1) can/must refuse authentication, or (2) may notify the legitimate owner of the identity. The identity provider can easily distinguish the legitimate user from an attacker by the given platform credentials.

In a further example, the method may include an attestation mechanism. The identity provider may challenge the user to provide information about the system state of the user platform. If the system is in a trustworthy state, access will be granted. This leverages security for web-applications, as only 'trustworthy' systems may access the Web service.

In a further example, instead of having a service application on the user side listening for incoming identity authentication requests and forwarding them to the TPM, a seamless browser integration may be used. This may be achieved by using a browser extension that implements the applicable functionality. The identity provider issues the challenge inside the HTML code of the sign-in page. A browser extension may read this information and forward the necessary data to the TPM. The TPM in turn creates the signed ticket and returns it to the browser extension. The extension may then issue the correct HTTPS response to the identity provider including the signed ticket. In this instance, the flow of FIGS. 3(a) and 3(b) would be handled by a seamless integrated browser extension instead of a separate extension. This solution allows for greater portability and better user experience.

In general, a method for trusted authentication and access from a user platform comprises logging onto a service provider using a predetermined identity, wherein the user platform is redirected by the service provider to an identity provider that is pointed to by the predetermined identity. The method further includes receiving an authentication challenge from the identity provider and in response to the authentication challenge, transmitting a ticket based on a trusted platform module (TPM) on a condition that the user platform accepted the authentication challenge. The method further includes accessing the service provider on receiving successful ticket verification from the identity provider. The predetermined identity is represented by a universal resource identifier. The method further includes generating a ticket validating the user platform and the ticket. The authentication challenge includes at least the predetermined identity and a type of service request. The method further comprises generating a certified signing key for signing the predetermined identity and the service request.

The method comprises providing a password for an attestation identity key (AIK) corresponding to the predetermined identity and a storage root key password for authenticating TPM usage. It also includes obtaining a certificate corresponding to an attestation identity key (AIK). The method further comprises generating a certificate on a condition that a previously acquired certificate is unavailable. The method further comprises receiving a nonce in response to a positive challenge acknowledgement and generating an attestation identity key (AIK) signed quote from the TPM, wherein the AIK signed quote includes the nonce. The ticket further comprises a certified signing key (CSK) signed predetermined identity, a CSK signed request, a CSK public key, and a privacy certification authority (PCA) issued attestation identity key (AIK) certificate.

The method further comprises in response to the authentication challenge, transmitting an attestation identity key (AIK) signed quote of the platform configuration registers (PCRs) from the TPM and a measurement log on a condition that the user platform accepted the authentication challenge. The successful ticket verification includes validating timestamp of the AIK certificate, verifying PCA signature on the AIK certificate, verifying AIK signature on the CSK public key, verifying the CSK signed predetermined identity, verifying the CSK signed request, validating the measurement log, and verifying the quote. The method further comprises receiving an encrypted cookie, protected by a certified signing key for subsequent service provider access. The authentication challenge includes an authorization challenge. The method further comprises an attestation challenge.

The apparatus for supporting trusted authentication and access includes an interface module configured to access a service provider using a predetermined identity, wherein the apparatus is redirected by the service provider to an identity provider that is pointed to by the predetermined identity. The apparatus also includes a ticket server configured to respond to an authentication challenge by transmitting a ticket based on a trusted platform module (TPM) on a condition that the authentication challenge is accepted. The interface module is also configured to receive a successful ticket verification from the identity provider and access services on the service provider. The ticket server is further configured to generate a ticket including a certified signing key (CSK) signed predetermined identity, a CSK signed request, a CSK public key, and a privacy certification authority (PCA) issued attestation identity key (AIK) certificate. The ticket server is further configured to obtain an attestation identity key (AIK) signed quote from the TPM and a measurement log. The ticket server is further configured to receive a nonce and generate an attestation identity key (AIK) signed quote from the TPM, wherein the AIK signed quote includes the nonce.

Figure 4:
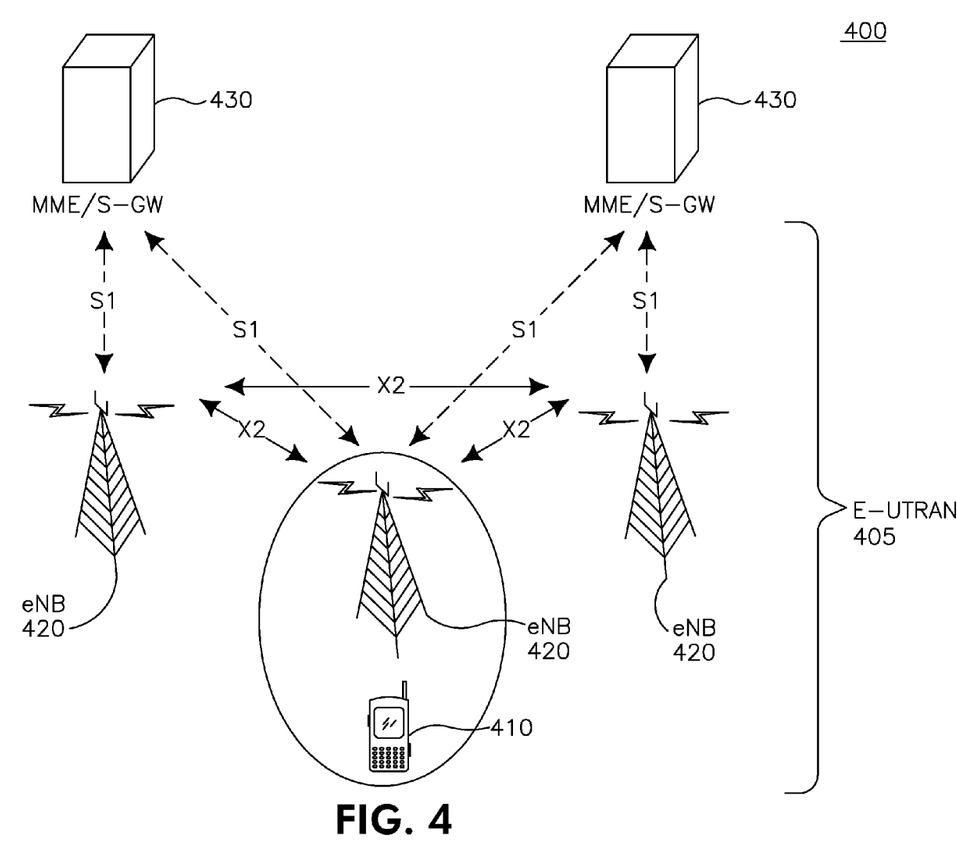
FIG. 4 is an embodiment of a wireless communication system/access network of long term evolution (LTE)

As disclosed herein, the user client/platform may be a WTRU or base station that may be used in, for example, in a wireless communication system. In one example, but also applicable to other wireless communication systems, FIG. 4 shows a Long Term Evolution (LTE) wireless communication system/access network 400 that includes an Evolved-Universal Terrestrial Radio Access Network (E-UTRAN) 405. The E-UTRAN 405 includes a WTRU 410 and several evolved Node-Bs, (eNBs) 420. The WTRU 410 is in communication with an eNB 420. The eNBs 420 interface with each other using an X2 interface. Each of the eNBs 420 interface with a Mobility Management Entity (MME)/Serving GateWay (S-GW) 430 through an S1 interface. Although a single WTRU 410 and three eNBs 420 are shown in FIG. 4, it should be apparent that any combination of wireless and wired devices may be included in the wireless communication system access network 400.

Figure 5:
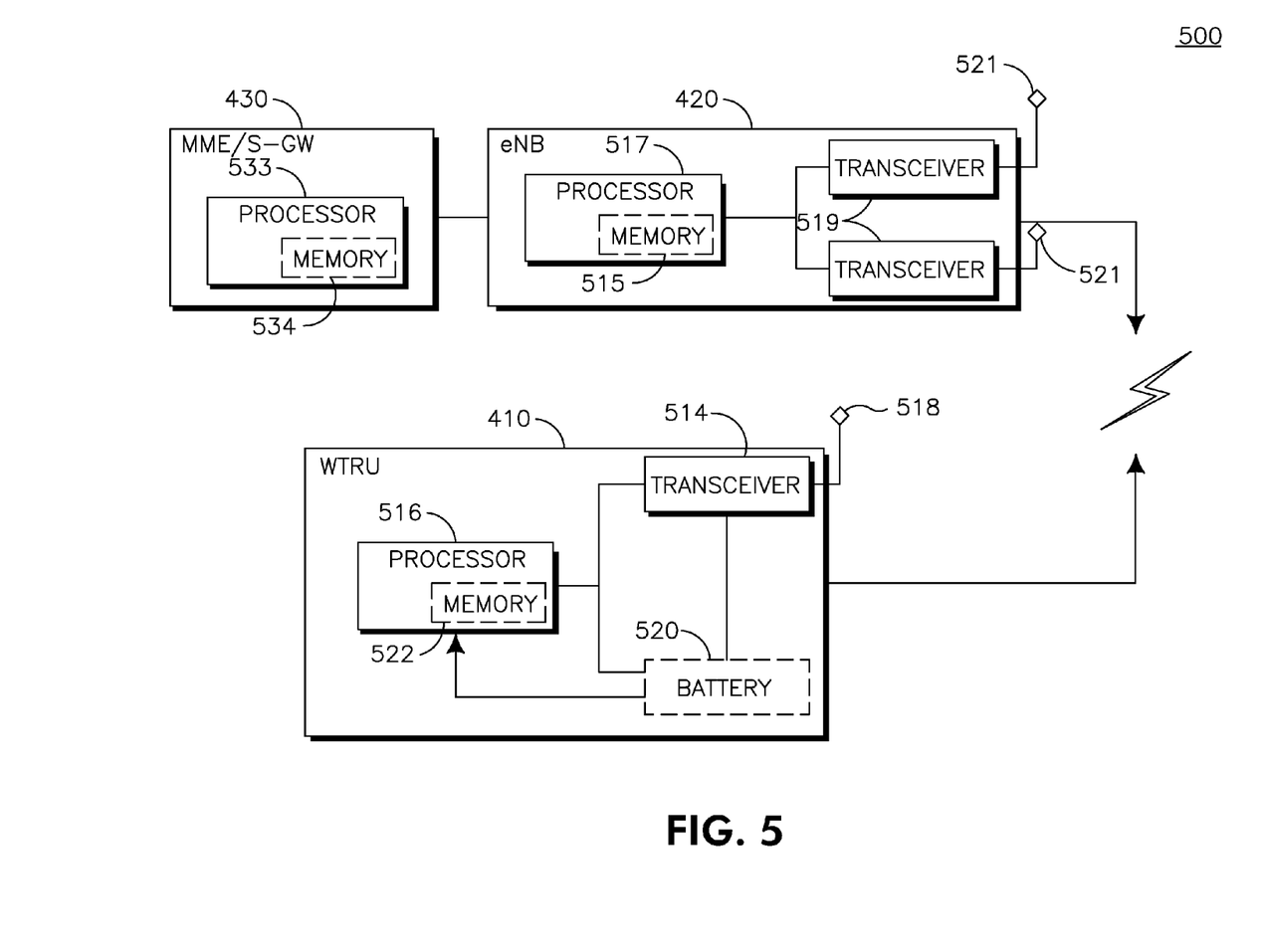
FIG. 5 are example block diagrams of a wireless transmit/receive unit and a base station of LTE wireless communication system.

FIG. 5 is an exemplary block diagram of an LTE wireless communication system 500 including the WTRU 410, the eNB 420, and the MME/S-GW 430. As shown in FIG. 5, the WTRU 410, the eNB 420 and the MME/S-GW 430 are configured to perform a method of blind decoding (BD) complexity reduction using linkage.

In addition to the components that may be found in a typical WTRU, the WTRU 410 includes a processor 516 with an optional linked memory 522, at least one transceiver 514, an optional battery 520, and an antenna 518. The processor 516 is configured to perform a method disclosed herein. The transceiver 514 is in communication with the processor 516 and the antenna 518 to facilitate the transmission and reception of wireless communications. In case a battery 520 is used in the WTRU 410, it powers the transceiver 514 and the processor 516.

In addition to the components that may be found in a typical eNB, the eNB 420 includes a processor 517 with an optional linked memory 515, transceivers 519, and antennas 521. The processor 517 is configured to perform a method disclosed herein. The transceivers 519 are in communication with the processor 517 and antennas 521 to facilitate the transmission and reception of wireless communications. The eNB 420 is connected to the Mobility Management Entity/ Serving GateWay (MME/S-GW) 430 which includes a processor 533 with an optional linked memory 534.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

The user platform may be any of a number of platforms including a WTRU. A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for trusted authentication and access from a user platform associated with a user, the user platform comprising a trusted module, the method comprising:
    logging onto a service provider using a predetermined identity associated with the user, wherein the user platform is directed to an identity provider that is associated with the predetermined identity;
    the user platform receiving an authentication challenge from the identity provider;
    in response to the authentication challenge, performing an authentication of the user;
    when the authentication is successful, the user platform obtaining a certificate that indicates a certification of the trusted module by a certification authority;
    generating, at the trusted module; an authentication response to the authentication challenge wherein the authentication response comprises the certificate, and the certificate indicates the certification of the trusted module by the certification authority;
    if a verification of the authentication response is successful, the user platform accessing the service provider upon receiving a status message indicating that the verification was successful, thereby ensuring that the user of the user platform is legitimate; and
    if the verification fails, receiving a message associated with a cause of the failed verification.

2. The method of claim 1, wherein the predetermined identity is represented by a universal resource identifier.

3. The method of claim 1, wherein the authentication response comprises a ticket that comprises data that validates an authenticity of the ticket.

4. The method of claim 1, wherein the authentication challenge includes at least the predetermined identity and a type of service request.

5. The method of claim 4, further comprising generating a certified signing key for signing the predetermined identity and the service request.

6. The method of claim 1, wherein the predetermined identity is further associated with an attestation identity key (AIK), the method further comprising providing a password for the AIK corresponding to the predetermined identity and a storage root key password for authenticating usage of the trusted module.

7. The method of claim 1, wherein the predetermined identity is further associated with an attestation identity key (AIK), and wherein the certificate corresponds to the AIK.

8. The method of claim 7, wherein the certificate is obtained on a condition that a previously acquired certificate is unavailable.

9. The method of claim 1, wherein the predetermined identity is further associated with an attestation identity key (AIK), the method further comprising:
    sending a positive challenge acknowledgement in response to the authentication challenge received from the identity provider;
    receiving a nonce in response to the positive challenge acknowledgement sent to the identity provider; and
    generating a signed quote, wherein the signed quote is signed by the AIK and includes the nonce.

10. The method of claim 1, wherein the predetermined identity is further associated with an attestation identity key (AIK), and wherein the authentication response comprises a certified signing key (CSK) signed predetermined identity, a CSK signed request, a CSK public key, and a privacy certification authority (PCA) issued AIK certificate.

11. The method of claim 10, further comprising:
    retrieving, from the trusted module, a signed quote of one or more platform configuration register (PCR) values that describe a configuration of the user platform;
    in response to the authentication challenge, transmitting the signed quote of the PCR values from the trusted module and a measurement log, on a condition that the user platform accepted the authentication challenge, to the identity provider.

12. The method of claim 11, wherein the verification indicates that the identity provider validated a timestamp of the AIK certificate, verified a signature of the certificate authority on the AIK certificate, verified an AIK signature on the CSK public key, verified the CSK signed predetermined identity, verified the CSK signed request, validated the measurement log, and verified the quote.

13. The method of claim 1, further comprising receiving an encrypted cookie, protected by a certified signing key for subsequent service provider access.

14. The method of claim 1, % herein the authentication challenge includes an authorization challenge.

15. The method of claim 1, further comprising receiving an attestation challenge.

16. A user platform, which is associated with a user, for supporting trusted authentication and access, the user platform comprising communication circuitry such that the user platform is communicatively coupled to a network via its communication circuitry, wherein the user platform further comprises a processor, a trusted module, and a memory, the memory containing computer-executable instructions that when executed by the processor, cause the processor to:

access a service provider using a predetermined identity associated with the user, wherein the user platform is configured to be directed to an identity provider associated with the predetermined identity, and wherein the user platform is further configured to obtain a certificate that indicates a certification of the trusted module by a certification authority, the trusted module comprising a microcontroller configured to generate an authentication response to an authentication challenge received from an identity provider, wherein the authentication response comprises the certificate, and wherein the certificate indicates the certification of the trusted module by the certification authority;

if a verification of the authentication response is successful, access the service provider upon receiving a status message indicating that the verification was successful, thereby ensuring that the user of the user platform is legitimate; and     if the verification fails, receive a message associated with a cause of the failed verification.

17. The user platform of claim 16, wherein the predetermined identity is further associated with an attestation identity key (AIK), and wherein the authentication response includes a certified signing key (CSK) signed predetermined identity, a CSK signed request, a CSK public key, and the certificate, and wherein the certificate comprises a privacy certification authority (PCA) issued AIK certificate.

18. The user platform of claim 17, wherein the user platform is further configured to obtain an AIK signed quote and a measurement log from the trusted module.

19. The user platform of claim 16, wherein the predetermined identity is further associated with an attestation identity key (AIK), and wherein the user platform is further configured to receive a nonce and generate an AIK signed quote that includes the nonce from the trusted module.

20. A method for trusted authentication and access from a user platform associated with a user, the user platform comprising a trusted module, the method comprising:

logging onto a service provider using a predetermined identity associated with the user, wherein the user platform is directed to an identity provider that is associated with the predetermined identity, the predetermined identity further associated with an attestation identity key (AIK);

the user platform receiving an authentication challenge from the identity provider;

retrieving, from the trusted module, a signed quote of one or more platform configuration register (PCR) values that describe a configuration of the user platform;

in response to the authentication challenge, transmitting the signed quote of the PCR values from the trusted module and a measurement log, on a condition that the user platform accepted the authentication challenge, to the identity provider;

in response to the authentication challenge, performing an authentication of the user;

when the authentication is successful, the user platform obtaining an AIK certificate that indicates a certification of the trusted module by a privacy certification authority;

generating, at the trusted module; an authentication response to the authentication challenge, wherein the authentication response comprises the predetermined identity signed by a certified signing key (CSK), a CSK public key, and the AIK certificate or a reference to the AIK certificate;

if a verification of the authentication response is successful, the user platform accessing the service provider upon receiving a status message indicating that the verification was successful, thereby ensuring that the user of the user platform is legitimate; and     if the verification fails, receiving a message associated with a cause of the failed verification.

21. The method of claim 20, wherein the verification indicates that the identity provider validated a timestamp of the AIK certificate, verified a signature of the certificate authority on the AIK certificate, verified an AIK signature on the CSK public key, verified the CSK signed predetermined identity, verified the CSK signed request, validated the measurement log, and verified the quote.

\* \* \* \* \*

UNITED STATES PATENT AND TRADEMARK OFFICE
CERTIFICATE OF CORRECTION

| | | |
|---|---|---|
| PATENT NO. | : 9,490,984 B2 | Page 1 of 1 |
| APPLICATION NO. | : 12/558907 | |
| DATED | : November 8, 2016 | |
| INVENTOR(S) | : Leicher et al. | |

It is certified that error appears in the above-identified patent and that said Letters Patent is hereby corrected as shown below:

In the Claims

<u>Column 12,</u>
Claim 14,
Line 61, delete "% herein" and insert -- wherein --.

Signed and Sealed this
Twenty-first Day of February, 2017

Michelle K. Lee
*Director of the United States Patent and Trademark Office*